Sept. 19, 1967 R. F. ROULET ET AL 3,342,420
FLOW CONTROL VALVE
Filed Feb. 9, 1965 2 Sheets-Sheet 1
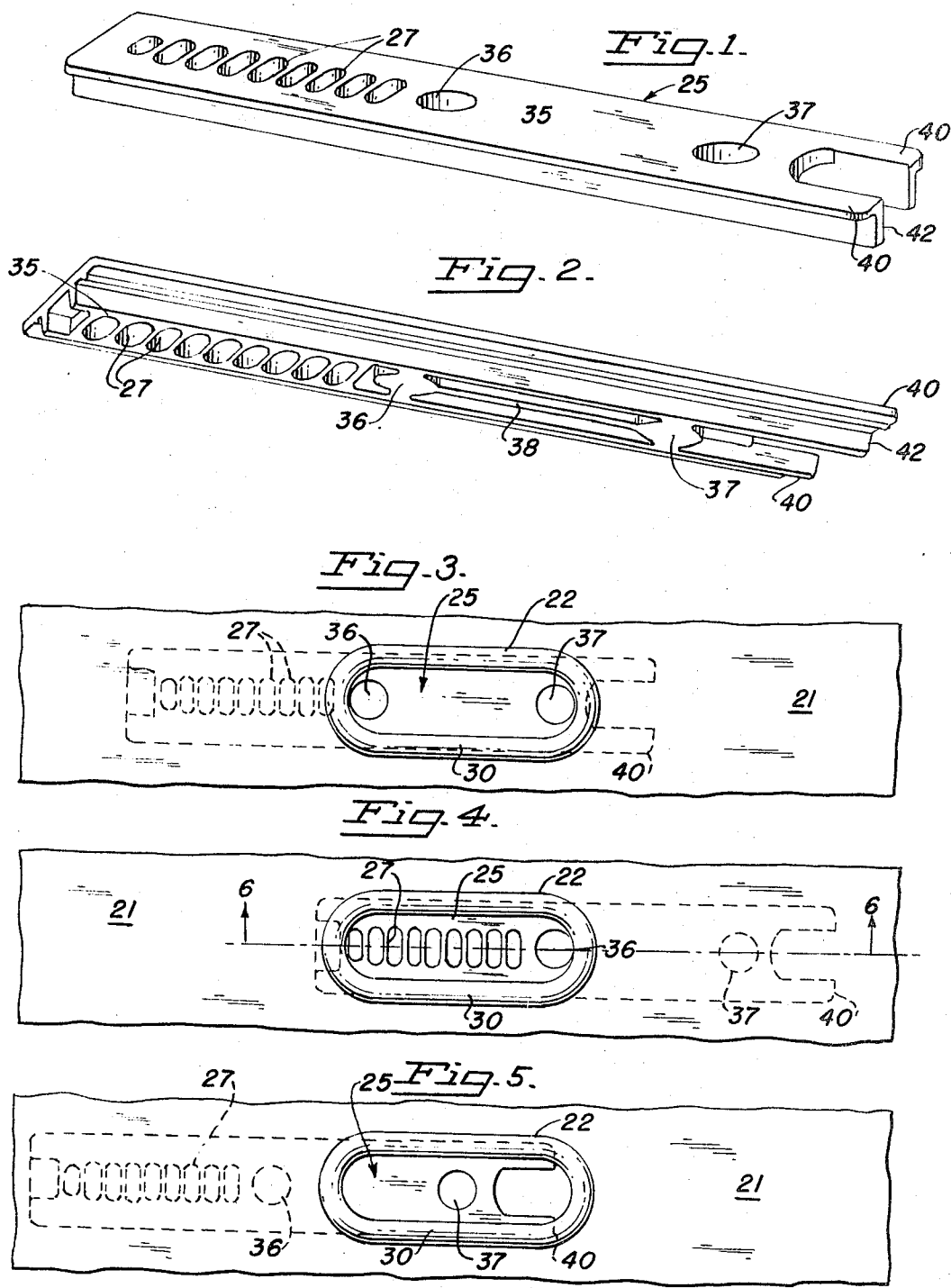
INVENTORS
ROBERT F. ROULET
WILLIS A. OWEN
BY
Owen, Wickersham & Erickson
ATTORNEYS

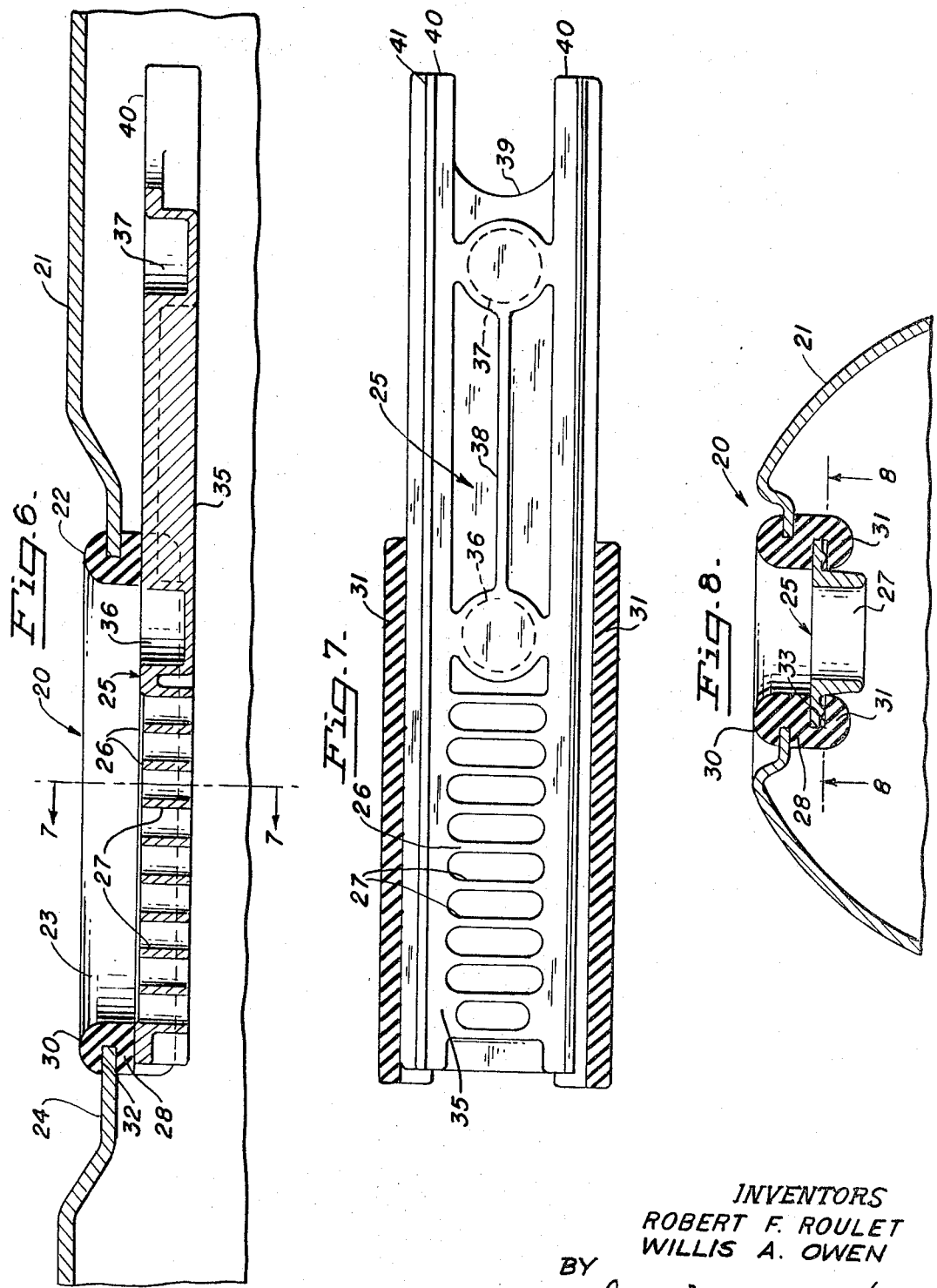

United States Patent Office 3,342,420
Patented Sept. 19, 1967

3,342,420
FLOW CONTROL VALVE
Robert F. Roulet, Fremont, and Willis A. Owen, Milpitas, Calif., assignors to W. R. Ames Company, Milpitas, Calif., a corporation of California
Filed Feb. 9, 1965, Ser. No. 431,258
1 Claim. (Cl. 239—395)

This invention relates to an improved gate valve for irrigation pipe, and particularly to a flow control valve for controlling the force and direction, as well as the quantity of liquid flowing through an opening or a perforation in such pipe.

In irrigation systems the pipe must often be situated on soil that is loose, as when it has been freshly tilled. With the flow control valves heretofore devised, the force of a concentrated stream flowing from the pipe often caused extensive erosion, and hence, damage to the growing crop in the area surrounding the pipe opening. Also, the direction of flow from such control valves was unpredictable and varied for different flow rates. This further aggravated the erosion problem, and often disrupted the desired flow pattern of water in the irrigation system. It is, therefore, a general object of the present invention to provide a control valve for irrigation pipe and the like that is capable of maintaining a sufficient quantity of flow from the pipe while also diffusing the flow and maintaining a predetermined direction of flow relative to the pipe axis regardless of the liquid velocity.

Another object of the invention is to provide an improved flow control valve for irrigation pipe and the like that is easily adjustable to provide either an undiffused or a diffused stream of water, as well as controlling the quantity thereof.

Still another object of the invention is to provide a flow control valve adapted for use with irrigation pipe and the like that is particularly well adapted for ease and economy of manufacture.

Still another object of the present invention is to provide a diffusing and flow control valve gate member in combination with a valve frame that may be quickly installed by hand into a perforation in a pipe from the outside, and which will not be blown out by high liquid pressure inside the pipe. The present invention thus constitutes an improvement over and it may utilize some of the features of the flow control valve generally shown in U.S. Patent No. 2,771,904 which discloses a rim or frame assembly for supporting the gate member that can be readily installed in a pipe opening.

Another more specific object of our invention is to provide a flow control valve having a length substantially greater than the length of the pipe opening which can be manipulated in two ways, either to control the quantity of flow through the opening or to diffuse the flow to reduce the force of the stream, and further to provide a slidable gate assembly with a central slide member that can be articulated to open a flow passage through a series of slots in one position and which will provide a fluid tight seal to stop any flow when moved to another position.

Other objects, advantages and features of the invention will be apparent from the following detailed description of one embodiment thereof and from the drawings, in which:

FIG. 1 is a view in perspective showing a slidable gate assembly for a flow control valve embodying the principles of the invention;

FIG. 2 is a view in perspective showing the underside of the slidable gate assembly of FIG. 1;

FIG. 3 is a plan view of a flow control valve having a gate assembly as shown in FIGS. 1 and 2 with the gate in the fully closed position;

FIG. 4 is a plan view showing the flow control valve of FIG. 3 with the gate assembly in the position for diffused flow;

FIG. 5 is a plan view showing the flow control valve of FIG. 3 in a position for limited undiffused flow;

FIG. 6 is an enlarged view in side elevation and in section taken along the line 6—6 of FIG. 4;

FIG. 7 is a view in end elevation and in section taken along the line 7—7 of FIG. 6;

FIG. 8 is an enlarged plan view partially in section taken along line 8—8 of FIG. 7.

In the drawings, FIGS. 3 through 5 show a flow control valve 20 embodying the principles of the invention as it appears in a typical installation in the wall of an irrigation pipe 21. Broadly considered, the valve 20 comprises a frame 22 surrounding and fixed to the edge of an opening 23, preferably formed in a flattened portion 24 of the pipe wall. Supported within the frame 22 is a slidable gate member 25 which is thus movable manually across the opening 23. The gate member 25 can cover the opening 23 completely and thereby completely stop the flow of water through it, or it can be moved longitudinally within the frame 22 to any desired position to establish the desired flow rate through the opening. Provided along the gate member 25 nearer one end thereof are a series of longitudinally spaced apart slot-like transverse openings 27 which have more than one important function in our invention. When the gate member 25 is positioned so that these slots 27 are exposed along the opening 23, the water flowing therethrough will be diffused instead of being in the form of a heavy steady stream as it leaves the pipe 21. Moreover, the slot-like openings 27 serve to impart directional control to the water passing through them. Thus, since the sides of the openings 27 are all essentially perpendicular to the axis of the pipe 21, the water will always pass through these openings and exit from pipe at an angle of 90° to the pipe axis, despite the velocity of the water within the pipe. These are both important features of our invention because they make it possible for the pipe to be installed in a predetermined position so that the water passing through the flow control valve will always go in the same direction despite its flow rate. Thus, although a large quantity of water can flow from the pipe, it can be directed so as not to cause damaging soil erosion on the surrounding area or otherwise disrupt an established irrigation pattern, and the quantity itself can be controlled by sliding the gate member 25 to a position wherein only a few of the slots 27 are exposed in the opening 23.

In all of the embodiments of the invention the frame 22 supporting the gate member 25 may be similar to that shown in U.S. Patent No. 2,771,904. It is preferably formed of a molded resilient material so that it can be easily installed in the pipe opening 23 which has been formed in the flattened or depressed area 24. As shown, it has a flat body portion 28 adapted to seal against the inside wall of the pipe bordering the opening 23. The frame 22 forms an elongated opening that is smaller, but similar in shape to the pipe opening 23. It has a radially outwardly extending continuous flange 30 and a pair of radially inwardly extending parallel flanges 31. The flange 30 combines with the body portion 28 to form a continuous groove 32, which completely embraces the metal around the pipe opening 23. The periphery of the base of this groove 32 corresponds generally to the periphery of the opening 23 in the pipe wall. The flanges 31 extend from the inner side of the body portion 28, parallel to the longitudinal sides of the opening 23; and they are turned inwardly to form lineal spaced-apart grooves 33 for receiving the slidable gate member 25.

The gate member 25 will now be described in greater detail with reference to FIGS. 1 and 2. Essentially, it is an elongated body member with an overall length that is substantially equal to, but preferably greater than twice the length of the valve opening 23. It may be made from any suitable material such as metal or plastic and preferably it is molded as a unitary integral member. Extending along its length is a relatively thick central body portion 35 near one end of which are a series of transverse spaced apart webs 26 forming the diffusing and direction controlling slots 27. This group of slots covers a length of the gate member that is somewhat less than the length of the pipe opening 23. The remaining part of the central body portion 35 has a smooth planar upper surface except for a pair of recessed grip members 36 and 37 which provide means for engaging or gripping the gate member 25 with one's fingers to move it back and forth in adjusting the flow rate from the pipe. The first recessed member 36 is located at the end of the array of slots 27, and spaced from it at the other end of the central body portion 35 is the second recessed member 37 forming a similar hand gripping means. As shown in FIGS. 6 and 8, the members 36 and 37 are preferably formed as bosses when the gate member is molded, with lightening cavities surrounding their walls. These cavities form an integral web member 38 interconnecting the boss members 36 and 37 and also spaced apart longitudinal side portions 42 which together provide the strength and rigidity required in the gate member 25.

Just beyond the second recessed grip member 37 at the end of the central body portion of the gate member, is a cut out portion 39 extending longitudinally for a predetermined length. This cut out provides a clear opening to accommodate a full undiffused stream of water from the pipe when maximum flow is desired.

Extending laterally outwardly from opposite sides of the central body member 35 and longitudinally along its full length are a pair of side flanges 40 which support the gate member within the opposite grooves 33 of the valve frame 22. The nominal thickness of the flanges 40 is somewhat less than the width of the grooves 33, but on the underside of each flange is a longitudinally extending integral bead member 41. Along this bead member the overall thickness of the flanges is substantially equal to the width of the slots so that the gate member is secured firmly therein and yet will slide back and forth with a minimum of frictional resistance due to the bead members.

Once installed with the valve member 22 around the periphery of the pipe opening 23 and the gate member 25 slidably mounted in the opposing grooves 33, the valve is easily operated. In FIGS. 3 through 5 the valve 20 is shown with the gate member 25 in three different positions. FIG. 3 shows the gate member completely closed with no water flowing and here the gate member, in combination with the valve frame 22, forms a fluid tight seal. FIG. 4 shows the gate member 25 moved to a position for providing full diffused flow, and in FIG. 5 the gate member is in the position which allows undiffused flow through the end cut out opening 39. As seen, the position of the gate member 25 can be set to provide either a full or partial flow of diffused water. Since the distance on the central body 35, including the recessed members 36 and 37, is greater than the length of the pipe opening 23, the gate member 25 can be adjusted longitudinally to provide either a full or partial opening of the cut out portion 39 when desired. Adjustment of the gate member in either direction is easily accomplished by simply gripping either of the recessed members 36 or 37.

From the foregoing it should be apparent that our improved flow control valve can be easily manipulated to control both the direction and quantity of flow from a pipe, as well as the force of the stream through the valve opening. Another feature of our valve is that the valve gate member 25 is readily adaptable and can be quickly installed within valve frames having grooves which are presently installed in or are otherwise available for irrigation pipe. During the installation of the new gate assembly, the flexible valve housing or frame can be deformed sufficiently by hand to remove it if necessary for replacement or for insertion of the gate assembly in its opposite grooves.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

In a flow control valve adapted for insertion in a perforation in the wall of a pipe or like surface, the combination of a rim member defining a flow opening; a radially extending open groove bordering said rim, conforming at its base to the general shape of the perforation in said wall; an open straight groove on the inner surface of one said rim facing, parallel and in the same plane as a second like groove thereon on the opposite edge, the two said grooves forming a support; and a rigid gate member slidably in said last mentioned grooved support to control the flow through said wall, said gate member comprising an elongated central body and side portions attached thereto slidably fitted within said opposite grooves, said central body being thicker than the side portions and having a series of transverse longitudinal spaced apart slots near one end for providing a diffused flow of liquid through the body, an axially open slot at its other end and an unslotted portion between the series of slots and the open slot, and a pair of recesses in the central body spaced apart a distance substantially equal to the distance between opposed walls of the flow opening whereby the gate member can be moved by engaging a finger with one or the other recesses.

References Cited
UNITED STATES PATENTS

| | | | |
|---|---|---|---|
| 609,578 | 8/1898 | Eastwood | 239—395 |
| 721,821 | 3/1903 | Myers | 251—206 X |
| 1,154,833 | 9/1915 | Baker | 239—395 |
| 2,060,943 | 11/1936 | Lieb | 239—395 |
| 2,499,738 | 3/1950 | Folsom | 239—563 |
| 2,771,904 | 11/1956 | Sherman et al. | 251—328 X |
| 2,925,244 | 2/1960 | Fox | 251—328 |
| 3,212,719 | 10/1965 | Di Corpo | 239—541 |

FOREIGN PATENTS

| | | |
|---|---|---|
| 135,173 | 11/1929 | Switzerland. |

M. HENSON WOOD, Jr., *Primary Examiner.*

VAN C. WILKS, *Assistant Examiner.*